Patented Dec. 14, 1926.

1,610,323

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF PULPING RAW CELLULOSIC MATERIAL.

No Drawing. Application filed December 24, 1925. Serial No. 77,625.

This invention has relation to a process of pulping raw cellulosic material such as wood chips for the production of cellulose fiber for use in the manufacture of newsprint, writing paper, or the like.

More particularly this invention is concerned with the production of fiber by the sulphite process of fiber liberation so-called, wherein a sulphurous acid solution of a sodium-sulphur salt is employed as the pulping reagent. A sulphite liquor of this type may consist essentially of a sulphurous acid solution of sodium sulphite, the usual sulphite liquor containing usually approximately 1% combined $SO_2$ and 5% free $SO_2$; but any other suitable proportion of free and combined $SO_2$ may be present therein if desired. A modified sulphite liquor for fiber liberation is described in my Patent No. 1,427,125, dated August 29, 1922, and consists essentially of a sulphurous acid solution of sodium sulphate. It is stated therein, however, that the pulping or fiber-liberating action is believed to be exercised by the relatively small amount of sodium sulphite constituent present in the liquor, and which is formed as a product of the reversible reaction which takes place between the sodium sulphate and the sulphurous acid. The sodium sulphite is continuously withdrawn from the sphere of reaction and is exhausted in the fiber-liberating action exercised thereby, but is continuously regenerated or reproduced from the relatively large amount of sodium sulphate which acts as the available source of raw material for the sodium sulphite necessary for the fiber-liberating action. In that patent, I preferably employ a liquor containing, say, about 4% sodium sulphate and 5% sulphur dioxide in the process, but these preportions are of course subject to variation. The use of sodium sulphate (salt cake) in the cooking liquor is advantageous, since the loss in sodium constituent in the process may be "made up" or replaced by other sodium sulphate, which is a cheaper material than either sodium carbonate or caustic soda, which are usually employed for "make up" purposes in sodium base sulphite liquors.

I have now discovered that I may replace a portion of the sodium constituent in soda base liquors, comprising either a sulphurous acid solution or sodium sulphite or a sulphurous acid solution of sodium sulphate or a mixture of the two solutions by niter cake ($NaHSO_4$) and therewith produce a high grade sulphite pulp essentially equivalent to sulphite pulps produced by sodium base liquors heretofore employed. Such substitution of sodium constituent by niter cake is very advantageous because niter cake is considerably cheaper than sodium sulphate as a raw material for supplying sodium constituent. The niter cake which may be utilized in the present invention is available as a by-product from the manufacture of hydrochloric acid wherein sodium chloride is treated with a concentrated sulphuric acid resulting in the liberation of such hydrochloric acid and leaving a residue of niter cake. If such niter cake is decomposed by sodium chloride with the application of heat, more hydrochloric acid is liberated and a residue of salt cake ($Na_2SO_4$) is produced, which, as before stated, is a more expensive raw material than the niter cake. Another industrial source of niter cake which is available for use as a raw material in the present invention is the niter cake resulting as a by-product in the production of nitric acid. In such case sodium nitrate is decomposed with a concentrated sulphuric acid, forming nitric acid, which distills off and leaves a residue of niter cake in the reaction retort.

Niter cake is an acid salt, namely sodium acid sulphate, and is therefore an intermediate between sodium sulphate and sulphuric acid. When dissolved in water it yields $$\overline{HSO_4} \text{ ions,}$$

which dissociate into $$\overset{+}{H} \text{ and } \overset{=}{SO_4} \text{ ions}$$

and consequently gives an acid reaction. A solution of niter cake may be considered as comprising one equivalent of sulphuric acid and one equivalent of sodium sulphate. In other words, by dissolving two equivalents of niter cake in water the same result is obtained as by adding an equivalent of free surphuric acid to an equivalent of sodium sulphate in solution.

I have found that, although I am able to pulp raw cellulosic material sucecssfully in a cooking liquor consisting essentially only of a sulphurous acid solution of niter cake, the pulp produced thereby is not readily bleachable to the desired degree of whiteness, and if an amount of bleach sufficient to produce a white product is employed, the strength, tear test and general papermaking qualities of the resultant pulp are impaired, thereby lowering the commercial value of such pulp. While I am unable to precisely account for the inability to produce a bleachable fiber from raw cellulosic materials by this cooking liquor, it may be that the sulphuric acid content of the liquor (which remains intact or substantially unaffected by the free $SO_2$ which is bubbled into a solution of niter cake to produce the liquor) prevents or represses to a very large extent the reversible ionic reaction of the sulphurous acid and the sodium sulphate in the liquor. In other words, because of the high concentration of one of the products of the reaction (sulphuric acid), the reaction to form sodium sulphite and sulphuric acid is repressed and insufficient sodium sulphite to effect the desired action on the ligneous or "woody" content of the raw cellulosic material is produced.

Thus, while a sulphurous acid solution of niter cake in itself does not yield a pulp possessing optimum characteristics with reference to bleachability, as previously stated, niter cake may be used in sulphite cooking liquors, together with other sodium compounds possessing a fiber-liberating action in sulphurous acid solution, to yield a very good grade of pulp substantially equivalent to the usual high grade sulphite pulps produced by the use of sodium base digesting liquors.

In accordance with the present invention, raw cellulosic material, e. g., spruce chips, are digested in an acid cooking liquor containing 2% niter cake, 2% sodium sulphate, and 5% free $SO_2$ to yield the usual high grade sodium base sulphite pulp. Or the fiber liberation of the cellulosic material may be carried out in a cooking liquor containing niter cake, sodium sulphite and free $SO_2$. A typical cooking liquor contains about 2% niter cake, about 0.5% combined $SO_2$, and 5% free $SO_2$. Or, if desired, a mixture of the reagents employed in the two liquors described and consisting of a solution of niter cake, salt cake, sodium sulphite and a suitable quantity of free $SO_2$ may be employed as the digesting liquor.

In actual practice the same procedure may be followed for the digestion of raw cellulosic material with the cooking liquors herein described as in the digestion of wood chips in the usual calcium bisulphite liquor. That is to say, I employ the same type of digester and supply the chips and the cooking liquor thereto and otherwise follow out the same procedure as is generally followed, relieving the digester and making the tests from time to time as may be needed until the fiber liberation is completed. Steam is injected as ordinarily to cause an ebullition of the mass in the digester and to raise the pressure and the temperature to the desired degrees.

After the digesting operation is completed, the digester is blown and the $SO_2$ liberated from the spent liquor and arising from the blow pit may be recovered by known approved processes. The spent liquor is separated from the pulp and is collected in a storage tank. After neutralization, preferably with alkaline sodium compounds, it is subjected to a recovery process substantially like that described in the proces of the patent previously referred to. In this process the spent liquor is evaporated and concentrated to the desired degree Baumé and then delivered in a disrupted state under pressure into a recovery retort, wherein the organic content of the liquor is consumed and the valuable inorganic content is smelted under oxidizing conditions to yield a smelt consisting essentially of sodium sulphate and a relatively small amount of sodium carbonate. The effluent smelt from the furnace is caught in the desired amount of water in a dissolving tank and may subsequently be acidified with the desired amount of $SO_2$ for the preparation of fresh digesting liquor.

The sodium constituent and sulphur dioxide arising in the smelting operation from the recovery retort may be recovered as, for example, by the process described in my application, Serial No. 661,240, filed Sept. 6, 1923, and reintroduced into the cycle at the desired points. The sulphur dioxide may, for instance, be used in the acidification of the smelt liquor for the production of the fresh acid digesting liquor.

Sufficient niter cake in addition to the sodium constituent employed for neutralization may be added to the smelt liquor to make up the various sodium losses encountered during the cycle and to produce a liquor of the desired niter cake content. The smelt liquor is then acidified for the production of a digesting liquor having the desired free $SO_2$ content. The re-generated or fresh digesting liquor will thus usually consist essentially of a sulphurous acid solution of sodium sulphate and niter cake, together with a relatively smaller amount of sodium sulphite.

By the practice of the present invention I am enabled to produce a high grade pulp, substantially equivalent to the usual high grade sulphite pulps resulting from the digestion of wood chips in sodium base liquors. The pulp is of good color and good strength and has easy beating properties. The amount of sulphuric acid present in the digesting liquor owing to the presence of the niter cake and the reaction of the sulphurous acid with the salt cake is not sufficient to injure the fiber. As a matter of fact, the presence of the sulphuric acid promotes a liberation of pulp at a lower temperature of digestion and in a shorter period of time than ordinarily. This is probably due to the fact that the hydrolytic or dissolving action exercised by the liquor on the encrusting or cementitious content of the chips and resulting in the liberation of fiber is favored materially by the large amount of hydrogen ion furnished by the sulphuric acid.

Another great advantage is, that I am enabled to recover the sodium constituents in the spent liquor, and to make up a certain portion of the losses in the cycle by the addition of niter cake, which is a cheap form of raw material for sodium constituent. This results in a material saving in the cost of raw material. Moreover, the process herein outlined avoids any causticizing step in the preparation of the fresh digesting liquor and avoids the necessity of dumping the spent liquor into and thus contaminating nearby flowing streams.

Having thus described certain embodiments of this invention,

What I claim is:

1. An acid cooking liquor for the liberation of fiber from raw cellulosic material including niter cake in solution.

2. A cooking liquor for the liberation of fiber from raw cellulosic material including a sulphurous acid solution of niter cake.

3. A cooking liquor for the liberation of fiber from raw cellulosic material comprising a sulphurous acid solution of niter cake together with sodium sulphur compounds possessing a fiber-liberating action in sulphurous acid solution.

4. A cooking liquor for the liberation of fiber from raw cellulosic material, comprising a sulphurous acid solution of niter cake and sodium sulphite.

5. A cooking liquor for the liberation of fiber from raw cellulosic material comprising a sulphurous acid solution of niter cake and salt cake.

6. A cooking liquor for liberation of fiber from raw cellulosic material, comprising a sulphurous acid solution of niter cake, salt cake and sodium sulphite.

7. A process which comprises digesting raw cellulosic material in a sulphurous acid solution of niter cake and sodium-sulphur compounds possessing fiber-liberating action in sulphurous acid solution, separating the spent liquor from the resultant pulp, and recovering the sodium compounds from such spent liquor.

8. A process which comprises digesting raw cellulosic material in a sulphurous acid solution of niter cake and sodium-sulphur compounds possessing fiber-liberating action in sulphurous acid solution, separating the spent liquor from the resultant pulp, concentrating the spent liquor by evaporation, burning the combustible content and smelting the inorganic content thereof, and recovering such inorganic content in aqueous solution.

9. A process comprising the following steps: digesting raw cellulosic material in a sulphurous acid solution of niter cake and sodium-sulphur compounds possessing fiber-liberating characteristics in sulphurous acid solution, separating, neutralizing and concentrating the spent liquor of digestion and smelting the sodium constituent thereof in an oxidizing atmosphere, recovering the smelt in aqueous solution, and acidifying the aqueous solution with sulphur dioxide, thereby producing sulphurous acid solution of sodium-sulphur compounds for the repetition of said first-mentioned step.

In testimony whereof I have affixed my signature.

GEORGE A. RICHTER.